(12) United States Patent
Ding et al.

(10) Patent No.: US 6,259,052 B1
(45) Date of Patent: Jul. 10, 2001

(54) ORBITAL FRICTION STIR WELD SYSTEM

(75) Inventors: R. Jeffrey Ding, Athens, AL (US); Robert W. Carter, Columbus, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/216,484

(22) Filed: Dec. 18, 1998

(51) Int. Cl.$^7$ ................................................ B23K 11/00
(52) U.S. Cl. .................. 219/59.1; 228/25; 219/78.01; 219/125.11
(58) Field of Search ............................... 228/25, 4.1, 47.1, 228/48, 112.1, 114.5, 29, 44.5, 234.1, 2.1, 2.3; 219/56, 59.1, 60 A, 125.11

(56) References Cited

U.S. PATENT DOCUMENTS

| | | | |
|---|---|---|---|
| 3,741,555 | * | 6/1973 | Roesel ............................... 266/23 M |
| 3,777,101 | * | 12/1973 | Gwin et al. ........................ 219/60 A |
| 3,841,547 | * | 10/1974 | Bartley ................................. 228/29 |
| 4,145,593 | * | 3/1979 | Merrick et al. .................... 219/60 A |
| 4,365,132 | * | 12/1982 | Kazlauskas et al. ............... 219/60 A |
| 4,649,250 | * | 3/1987 | Kazlauskas ........................ 219/60 A |
| 5,844,190 | * | 12/1998 | Benway et al. .................... 219/60 A |

* cited by examiner

Primary Examiner—Patrick Ryan
Assistant Examiner—M. Alexandra Elve
(74) Attorney, Agent, or Firm—Jerry L. Seemann

(57) ABSTRACT

This invention is an apparatus for joining the ends of two cylindrical (i.e., pipe-shaped) sections together with a friction stir weld. The apparatus holds the two cylindrical sections together and provides back-side weld support as it makes a friction stir weld around the circumference of the joined ends.

10 Claims, 5 Drawing Sheets

ORBITAL FRICTION STIR WELD SYSTEM

ORIGIN OF THE INVENTION

The invention described in this patent was made by employees of the United States Government and may be manufactured and used by or for the Government for governmental purposes without the payment of any royalties.

BACKGROUND OF THE INVENTION

1. Field of the Invention

In general, this invention pertains to friction stir welds. Specifically, this invention pertains to an apparatus for making a friction stir weld around the circumference of a cylindrical work piece.

2. Background Information

Friction stir welding is a relatively new welding technique for joining like materials together. The friction stir technique uses a frictional heat source to plasticize adjoining sections of the same material. Once plasticized, the frictional heat source is removed and the sections join together. A rapidly spinning probe, which must be capable of sustaining the requisite plasticized temperatures, is commonly used as the frictional heat source. The spinning probe also facilitates mixing of the material in the plasticized region. A more complete description of friction stir welding can be found in U.S. Pat. No. 5,460,317.

Like most new techniques, friction stir welding is not without its challenges. For example, significant forces are necessary for a spinning probe to penetrate and remain within the sections of a work piece that are to be joined. As a result, the weld joint must be properly supported on the back side in order to make the friction stir weld possible or prevent unwanted damage to the work piece. Providing back-side weld support can be nothing short of difficult with particular work piece geometries.

SUMMARY OF THE INVENTION

This invention is an apparatus for joining the ends of two cylindrical (i.e., pipe-shaped) sections together with a friction stir weld. The apparatus holds the two cylindrical sections together and provides back-side weld support as it makes a friction stir weld around the circumference of the joined ends.

An object of this invention is to make a friction stir weld around the circumference of a cylindrical work piece.

Another object of this invention is to provide back-side weld support when making a friction stir weld around the circumference of a cylindrical work piece.

BRIEF DESCRIPTION OF THE DRAWINGS

The following discussion of the invention will refer to the accompanying drawings in which.

DESCRIPTION OF THE PREFERRED EMBODIMENT

Figure 1:
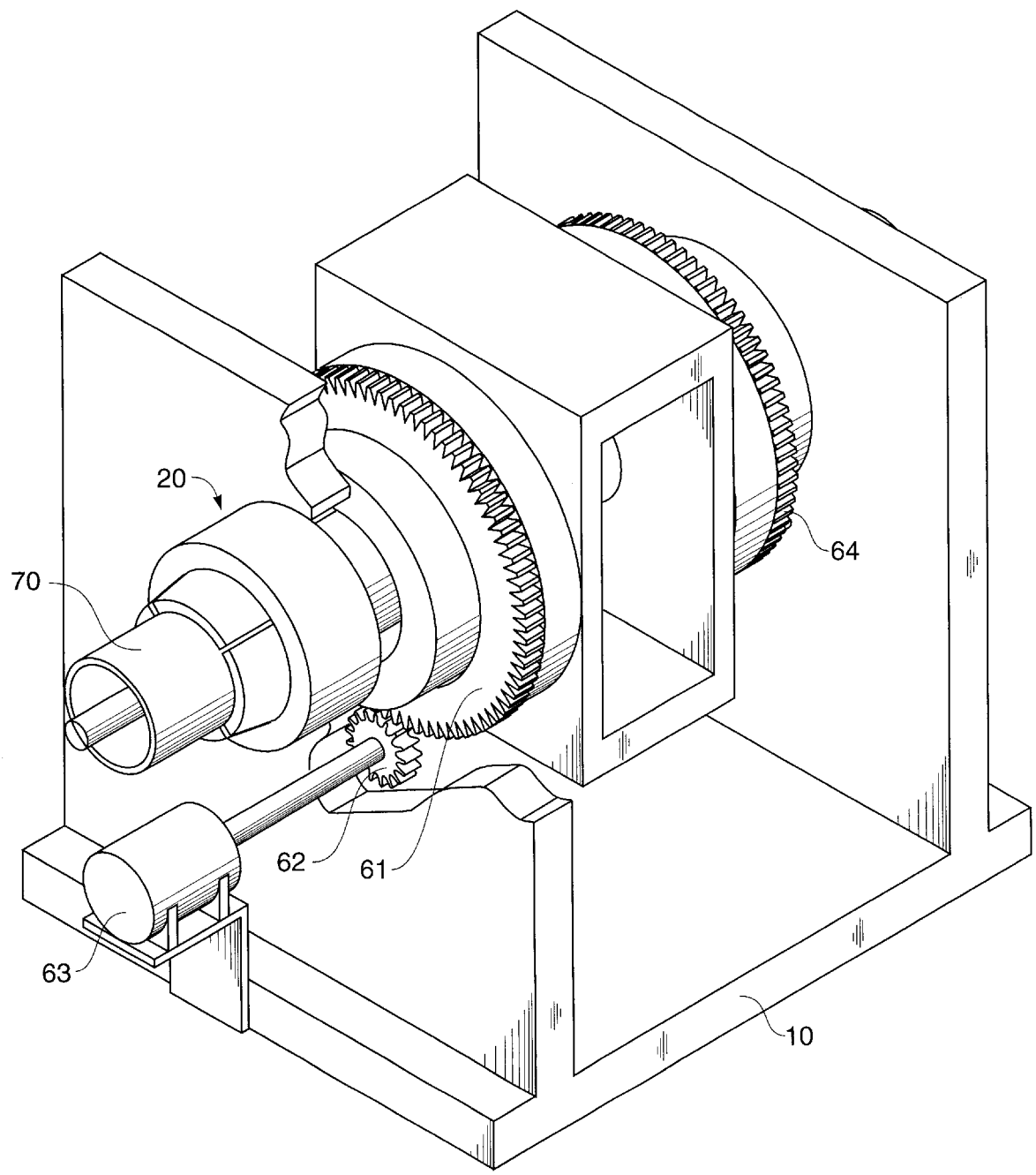
FIG. 1 represents a perspective view of the orbital friction stir weld system.
Figure 2:
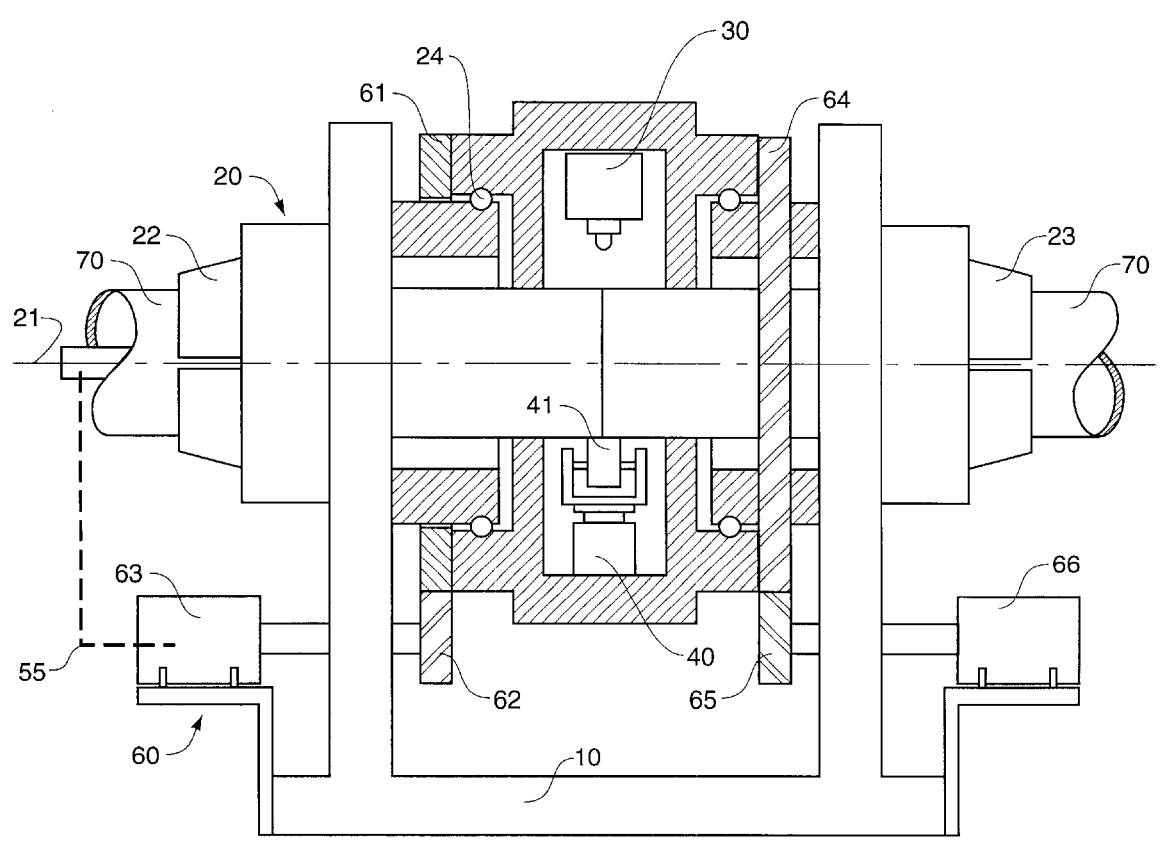
FIG. 2 represents an elevation view of orbital friction stir weld system.
Figure 3:
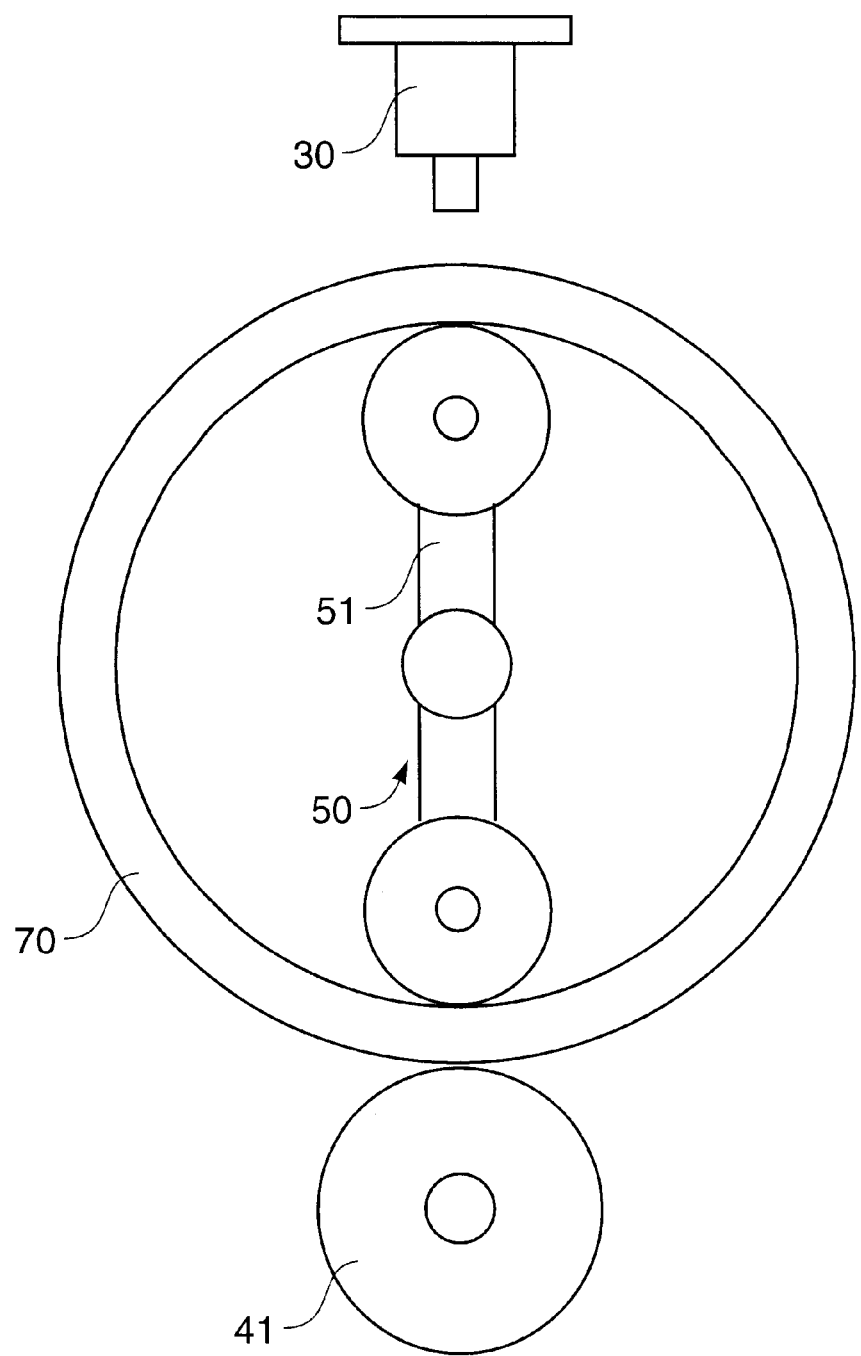
FIG. 3 represents a partial side view of the orbital friction stir weld system.

Referring to FIGS. 1, 2, and 3, a preferred embodiment of this invention comprises a base frame (10), a cylindrical clamping mechanism (20) for securing a cylindrical work piece (70), a weld head (30), a reaction support (40), a means for transmitting load from the weld head to the reaction support (50), and a means for rotating said weld head in conjunction with said reaction support around the longitudinal axes of said first and second clamping mechanisms (60).

The cylindrical clamping mechanism (20) has a longitudinal axis (21), is secured to the base frame (10), and may consist of a variety of devices. A rudimentary clamping mechanism may consist of several set screws placed in a ring through which the cylindrical work piece (70) can be placed and secured. The mechanism shown in FIGS. 1 and 2 is a chuck similar to that used to hold material being worked on a machine such as a lathe. Obviously, other clamping mechanisms may also be used. Since the cylindrical work piece (70) will probably be in two sections, the cylindrical clamping mechanism (20) must be capable of securing both sections of the work piece (70). Thus, in the preferred embodiment, the cylindrical clamping mechanism (20) has a first part (22) and a second part (23) that are spaced along the longitudinal axis (21) of the cylindrical clamping mechanism (20) and separated by the weld head (30) and the reaction support (40).

The weld head (30) and the reaction support (40) are rotationally mounted to the base frame (10) such that the weld head (30) can rotate completely around the longitudinal axis (21) of the cylindrical clamping mechanism (20) and the reaction support (40) can be maintained in a position diametrically opposed to the weld head (30). In the preferred embodiment, rollers (24) are mounted on the cylindrical clamping mechanism (20). The rollers (24) provide the mechanism by which the weld head (30) and the reaction support (40) are rotated around the circumference of the cylindrical work piece (70). In essence, the cylindrical clamping mechanism (20) functions like a stationary inner bearing race, the rollers (24) function like a bearing, and the weld head (30) and reaction support (40) function like a movable outer bearing race.

The weld head (30) is also movable in a radial direction. This radial movement capability accommodates a variety of work piece sizes and is necessary for the friction stir weld process itself. The reaction support (40) also has a roller (41) to facilitate movement of the reaction support (40) around the perimeter of the work piece (70).

In the preferred embodiment, the means for transmitting load from the weld head to the reaction support (50) is a radial load bar (51) that is able to rotate and stay aligned with the weld head (30) and the reaction support (40). Synchronized rotation (i.e., rotational alignment) may be accomplished with a motor and gearing mechanism (similar to that used to rotate the weld head (30) and the reaction support (40) described below) and with a control mechanism that coordinates the rotation of the radial load bar (51) with the weld head (30) and the reaction support (40). Dashed line (55) in FIG. 2 symbolically represents the rotational alignment mechanism.

Figure 4:
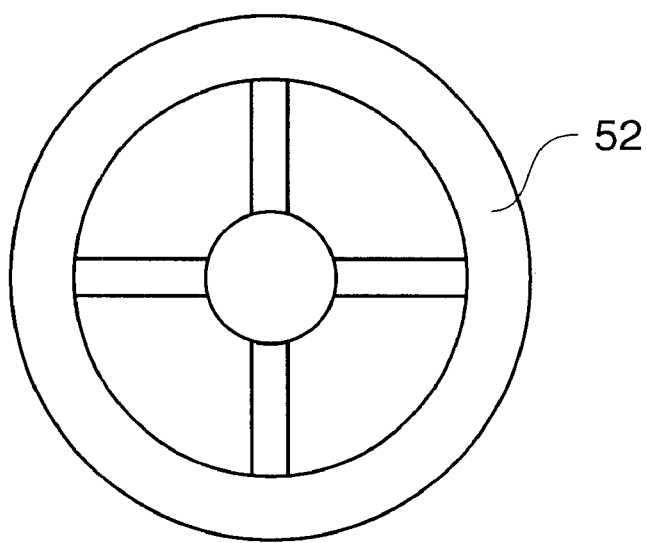
FIGS. 4, 5*a*, and 5*b* represent alternative devices for providing back-side weld support.
Figure 5:
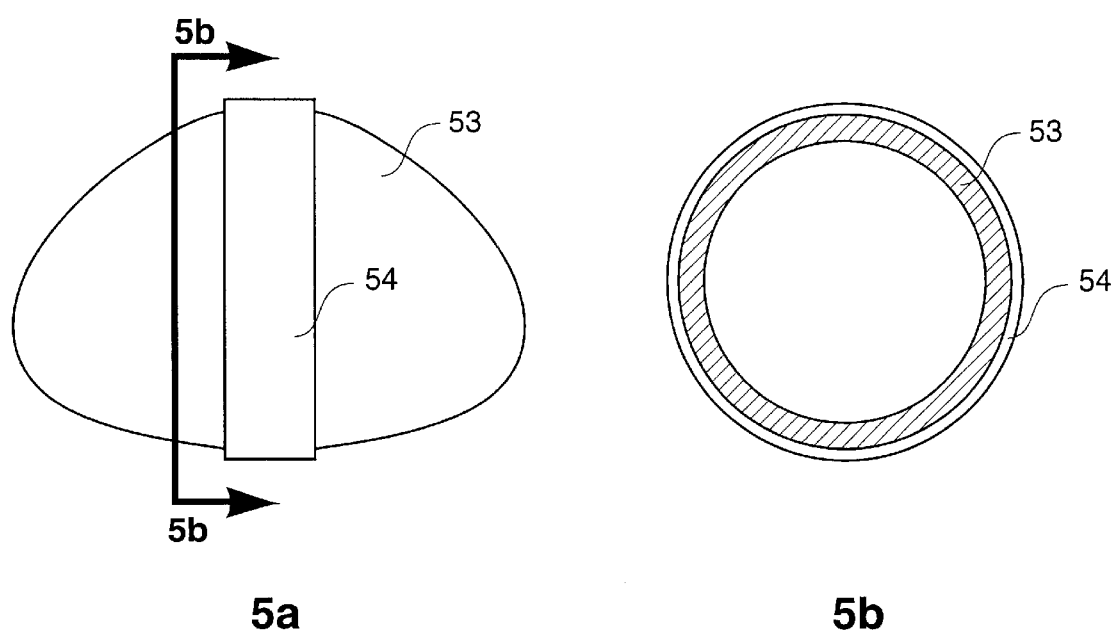

Alternative embodiments for the load transmitting means include use of a wagon wheel brace (52) (see FIG. 4) or use of an inflatable bladder (53) reinforced with a metal band (54) (see FIGS. 5*a* and 5*b*). While the wagon wheel brace (52) and the inflatable bladder (53) are not preferred, the wagon wheel and bladder do not require rotational coordination with the weld head (30) (i.e., the wagon wheel brace (52) and the inflatable bladder (53) remain in a stationary position relative to the weld head (30)). If the work piece

(70) is solid or has some other internal support system, the work piece (70) itself can transfer the load from the weld head (30) to the reaction support (40).

Finally, referring again to FIG. 2, the means for rotating the weld head in conjunction with the reaction support around the longitudinal axis of the cylindrical clamping mechanism (60) includes a ring gear (61) that is attached to both the weld head (30) and the reaction support (40) and is concentric with the cylindrical clamping mechanism (20); a drive gear (62) engaged with the ring gear (61); and a motor (63) for controlling the rotation of the drive gear (62). In addition, a second ring gear (64) connected to a second drive gear (65) and a second motor (66) may be used to rotate the weld head (30) and the reaction support (40). The motors (63, 66) can also be used to synchronize rotation of the radial load bar (51) with the weld head (30) and reaction support (40). Obviously, several other equivalent methods exist for controlling rotation of the weld head (30), the reaction support (40), and the radial load bar (51).

An alternative embodiment of the invention comprises a cylindrical clamping mechanism (20) for securing a cylindrical work piece (70), a weld head (30), a reaction support (40), a means for transmitting load from the weld head to the reaction support (50), and a means for rotating said weld head in conjunction with said reaction support around the longitudinal axes of said first and second clamping mechanisms (60). This alternative embodiment is essentially the same as the preferred embodiment except for the base frame (10), which has been eliminated. In the alternative embodiment, the cylindrical clamping mechanism functions as the base frame. As a result, this alternative embodiment produces a device which has increased portability.

Operation of the invention is straightforward. Either the work piece is inserted into the cylindrical clamping mechanism or the cylindrical clamping mechanism is placed onto the work piece, depending on whether the preferred embodiment or the alternative embodiment is used, respectively. If needed, the load transmitting means (i.e., the radial load bar, the wagon wheel brace, the inflatable bladder, etc.) is positioned between the weld head and the reaction support. The weld head is then rotated around the weld head in order to make a friction stir weld.

What is claimed is:

1. An apparatus for making a weld around the circumference of a cylindrical object, comprising:
   a base frame;
   a cylindrical clamping mechanism attached to said base frame, said cylindrical clamping means having a longitudinal axis;
   a weld head rotationally mounted to said base frame such that said weld head can be located at any position around the longitudinal axis of said clamping mechanism;
   a reaction support rotationally mounted to said base frame such that said reaction support is diametrically opposite said weld head;
   means for transmitting load from said weld head to said reaction support; and
   means for rotating said weld head in conjunction with said reaction support around the longitudinal axis of said clamping mechanism.

2. An apparatus for making a weld around the circumference of a cylindrical object, as recited in claim 1, wherein said cylindrical clamping mechanism has a first part and a second part spaced along the longitudinal axis of said cylindrical clamping mechanism such that said weld head and said reaction support are located between said two parts.

3. An apparatus for making a weld around the circumference of a cylindrical object, as recited in claim 1, wherein said weld head is movable in a radial direction relative to the longitudinal axis of said cylindrical clamping mechanism.

4. An apparatus for making a weld around the circumference of a cylindrical object, as recited in claim 1, wherein said reaction support has a roller.

5. An apparatus for making a weld around the circumference of a cylindrical object, as recited in claim 1, wherein said means for transmitting load from said weld head to said reaction support, comprises:
   a radial load bar, said radial load bar extending between said weld head and said reaction support; and
   means for synchronizing rotation of said radial load bar with said weld head and said reaction support.

6. An apparatus for making a weld around the circumference of a cylindrical object, as recited in claim 1, wherein said means for transmitting load from said weld head to said reaction support comprises a wagon wheel brace, said wagon wheel brace is located between said weld head and said reaction support.

7. An apparatus for making a weld around the circumference of a cylindrical object, as recited in claim 1, wherein said means for transmitting load from said weld head to said reaction support comprises an inflatable bladder reinforced with a metal band, said metal band is located between said weld head and said reaction support.

8. An apparatus for making a weld around the circumference of a cylindrical object, as recited in claim 1, wherein said means for rotating said weld head in conjunction with said reaction support around the longitudinal axis of said cylindrical clamping mechanism comprises:
   a ring gear attached to said weld head and said reaction support, said ring gear is also concentric with said clamping mechanism;
   a drive gear engaged with said ring gear; and
   a motor for controlling rotation of said drive gear.

9. An apparatus for making a weld around the circumference of a cylindrical object, comprising:
   a base frame;
   a first cylindrical clamping mechanism attached to said base frame, said first cylindrical clamping means having a longitudinal axis;
   a second cylindrical clamping mechanism attached to said base frame, said second cylindrical clamping means having a longitudinal axis coincident with the longitudinal axis of said first cylindrical clamping mechanism;
   a weld head rotationally mounted to said first and second cylindrical clamping mechanisms such that said weld head can be located at any position around the longitudinal axes of said clamping mechanisms;
   a reaction support rotationally mounted to said first and second cylindrical clamping mechanisms such that said reaction support is diametrically opposite said weld head;
   means for transmitting load from said weld head to said reaction support; and
   means for rotating said weld head in conjunction with said reaction support around the longitudinal axes of said first and second clamping mechanisms.

10. An apparatus for making a weld around the circumference of a cylindrical object, comprising:
    a first cylindrical clamping mechanism, said first cylindrical clamping means having a longitudinal axis;

a second cylindrical clamping mechanism, said second cylindrical clamping means having a longitudinal axis coincident with the longitudinal axis of said first cylindrical clamping mechanism;

a weld head rotationally mounted to said first and second cylindrical clamping mechanisms such that said weld head can be located at any position around the longitudinal axes of said clamping mechanisms;

a reaction support rotationally mounted to said first and second cylindrical clamping mechanisms such that said reaction support is diametrically opposite said weld head;

means for transmitting load from said weld head to said reaction support; and means for rotating said weld head in conjunction with said reaction support around the longitudinal axes of said first and second clamping mechanisms.

* * * * *